United States Patent
Gram-Hansen et al.

(10) Patent No.: US 8,130,112 B2
(45) Date of Patent: Mar. 6, 2012

(54) METHOD OF ALARM MASK GENERATION AND CONDITION MONITORING OF WIND TURBINES

(75) Inventors: Klaus Gram-Hansen, Haderslev (DK); Axel Juhl, Haderslev (DK); Troels Kildemoes Moeller, Hurup Thy (DK)

(73) Assignees: Siemens Aktiengesellschaft, Munich (DE); Gram & Juhl A/S, Vojens (DK)

( * ) Notice: Subject to any disclaimer, the term of this patent is extended or adjusted under 35 U.S.C. 154(b) by 371 days.

(21) Appl. No.: 12/560,711

(22) Filed: Sep. 16, 2009

(65) Prior Publication Data

US 2010/0066555 A1 Mar. 18, 2010

(30) Foreign Application Priority Data

Sep. 17, 2008 (EP) .................................. 08016399

(51) Int. Cl.
*G08B 21/00* (2006.01)

(52) U.S. Cl. ........ 340/679; 340/648; 340/983; 340/601; 702/31; 702/32; 702/33; 702/39; 702/44; 416/39; 416/44; 416/169 R; 416/170 R

(58) Field of Classification Search .................. 340/679, 340/601, 648, 983; 702/31, 32, 33, 39, 44; 416/39, 44, 169 R, 170 R
See application file for complete search history.

(56) References Cited

U.S. PATENT DOCUMENTS

| | | | | |
|---|---|---|---|---|
| 5,942,690 A | * | 8/1999 | Shvetsky | 73/660 |
| 6,076,405 A | * | 6/2000 | Schoess | 73/587 |
| 6,231,306 B1 | * | 5/2001 | Khalid | 416/26 |
| 6,484,109 B1 | | 11/2002 | Lofall | |
| 6,785,637 B1 | | 8/2004 | Wobben | |

FOREIGN PATENT DOCUMENTS

WO WO 02095633 A2 11/2002

OTHER PUBLICATIONS

P. Caselitz, J. Giebhardt and R. Kewitsch, "Advanced Condition Monitoring System for Wind Energy Converters", Institut für Solare Energieversorgungstechnik (ISET), Dep. control Engineering, Kassel; SCHENK VIBRO GmbH, Darmstadt, EWEC 1999, Nice, France, pp. 63-66.

* cited by examiner

*Primary Examiner* — Tai T Nguyen

(57) ABSTRACT

In one aspect, an alarm mask for condition monitoring in a wind turbine is automatically generated. A reference data selecting definition is selected from a control definition repository in the wind turbine. The reference data selecting definition specifies a time interval of recorded reference data. Reference data is selected from a sensor located in the wind turbine recorded during the time interval. A reference value is calculated based on the reference data. A first and a second alarm mask factor are selected from the control definition repository. A first alarm mask is calculated based on multiplying the first alarm mask factor and the reference value. A second alarm mask is calculated based on multiplying the second alarm mask factor by the reference value.

18 Claims, 5 Drawing Sheets

METHOD OF ALARM MASK GENERATION AND CONDITION MONITORING OF WIND TURBINES

CROSS REFERENCE TO RELATED APPLICATIONS

This application claims priority of European Patent Office application No. 08016399.1 EP filed Sep. 17, 2008, which is incorporated by reference herein in its entirety.

FIELD OF INVENTION

This invention relates to a method of automatically generating an alarm mask for condition monitoring in a wind turbine, and a method of condition monitoring in a wind turbine and a wind turbine condition monitoring system therefor.

BACKGROUND OF INVENTION

In wind turbine control systems of the state of the art, alarm masks are used to determine if a wind turbine, or one of its components, is in a critical condition. If, for instance, the amount of vibration that is measured for a certain component of the wind turbine exceeds a certain value or condition as defined by the corresponding alarm mask, a critical operational state is present.

Typically, measurement values are associated with their corresponding wind turbine components by condition variables. In this manner, the measured value of the condition variable representing a certain wind turbine component or subsystem can give an accurate account of the present operational condition of that subsystem.

However, the measured values of the condition variables can vary between turbines of the same type and construction, since the dynamic behaviour of each wind turbine is individual to that particular turbine to a certain degree, although these wind turbines are of the same size and construction.

Thus, applying the same mask to all wind turbines of the same type can lead to an excessive number of false alarms for some of these wind turbines, while, at the same time, an unacceptably low detection probability is provided for other of these wind turbines.

Consequently, for each individual wind turbine, the alarm masks needed for proper condition monitoring have to be configured individually. Since this is usually performed manually in systems of the state of the art, the process of alarm mask configuration is costly and time-consuming.

U.S. Pat. No. 6,785,637 B1 shows a system that involves evaluating differences between currently recorded vibration spectra and previously recorded reference spectra. If the system detects deviations which exceed a predetermined threshold value, a fault message is produced.

P. Caselitz, J. Giebhardt, and R. Kewitsch propose, in their article "Advanced Condition Monitoring System for Wind Energy Converters", proceedings EWEC '99, Nice, France, pages 63 to 66, a wind turbine condition monitoring system which provides a learning mode and in which alarm levels are generated based on mean values and standard deviations of measurement values during normal and fault-free operation.

SUMMARY OF INVENTION

It thus is an object of present invention to provide a method of automatically generating alarm masks for condition monitoring of wind turbines in which alarm mask generation can be performed in each individual turbine, and in which the alarm masks generated are in accurate correspondence with the dynamic behaviour of its particular wind turbine, and a method of condition monitoring and a wind turbine condition monitoring system therefor.

This object is achieved by the subject-matter of the independent claims.

The invention according to an embodiment provides a method of automatically generating an alarm mask for condition monitoring in a wind turbine, comprising the steps of:

Selecting a reference data selecting definition from a control definition repository in the condition monitoring system of the wind turbine, wherein the reference data selecting definition specifies a time interval of recorded reference data, which is, for example, given by a number of condition variables recorded by the condition monitor of the wind turbine, where the condition variables are qualified by their standard deviation, meaning that the condition variables must be "steady" during the time interval recorded data is used (selected);

Selecting of reference data recorded from at least one sensor located in the wind turbine during the time interval;

Calculating at least one reference value, also called characterizing moment, based on the reference data;

Selecting a first alarm mask factor and a second alarm mask factor from the control definition repository;

Calculating a first alarm mask based on multiplying the first alarm mask factor by the reference value;

Calculating a second alarm mask based on multiplying the second alarm mask factor by the reference value.

Measurements monitored by a condition monitor, i.e. measured values of condition variables, in general depend on the operational state of the wind turbine being monitored. The n-dimensional space of the parameters describing the operational state of the wind turbine can be subdivided into a number of bins, each classifying a particular operational state of the wind turbine. As long as measured values of condition variables fall into the same bin the operational states corresponding to the respective values are said to be the same. The measured values of the condition variables may be tagged with an index representative for the bin the respective values fall into and, thus, for the wind turbine's operational state at the time the measurement was recorded. Evaluation of measurements can then be restricted to the measured values tagged with the same index.

Therefore, in the inventive method, a number of bins into which recorded reference data can fall can be defined, each bin representing a different operational state of the wind turbine. Then, for each reference data the bin is determined into which the respective reference data falls and for each combination of bin and reference data the following steps are performed:

Selecting a first alarm mask factor and a second alarm mask factor from the control definition repository;

Calculating a reference value based on the reference data falling in the respective bin;

Calculating the first alarm mask based on multiplying the first alarm mask factor by the reference value;

Calculating a second alarm mask based on multiplying the second alarm mask factor by the reference value.

Note that measured values of condition variables can also vary between turbines of the same type, Alarm masks then should be generated for each combination of turbine, bin and reference data (condition variables).

By having a control definition repository in the condition monitoring system of the wind turbine, from which various definitions are selected in the present method, such as reference data selecting definitions and alarm mask factors, the present method allows for efficient configuration and control of the automatic alarm mask generation process while the generation process thus controlled can automatically be executed in the condition monitoring system. Physically, the control definition repository may, e.g., reside in a central location of a wind park or in a remote location which may be common to multiple wind parks.

By providing a reference data selecting definition and by selecting recorded reference data according to that definition, each wind turbine obtains a set of reference data in a well-defined manner, that is, in the time interval or according to further parameters defined in the data selecting definition. Based on these reference data, alarm masks are automatically generated throughout further execution of the method.

Such reference data may, for example, be based on vibration measurements (acceleration measurements of the wind turbine and its components), on sound measurements (measurements of sound pressure), pulse counting in oil-debris monitoring equipment, or strain measurements.

By calculating a reference value based on the reference data for each defined bin (each bin describes an operational state of the wind turbine at the point of time of obtaining the measurement), the selected reference data is transformed into one or more characterizing value(s). The reference value can comprise a scalar but can also comprise any multi-dimensional value, such as a n-tuple or a matrix, or can be given as a function or curve.

By selecting a first alarm mask factor and a second alarm mask factor from the control definition repository, the calculation of the actual alarm mask based on the previously calculated reference value can be configured individually for each turbine, or can be set to any factory setting.

By calculating at least two alarm masks, namely a first alarm mask, or yellow alarm mask, and a second alarm mask, or red alarm mask, two different types of critical alarms can be generated by an appropriate wind turbine condition monitoring system. For instance, a yellow alarm can be used as a critical alarm that characterizes a temporary critical condition in the wind turbine, and a red alarm could be used to characterize a permanent defect in the wind turbine system. Of course, more than two alarm masks can be calculated.

The invention can be embodied as provided in the dependent claims and/or as given in the detailed embodiment.

In embodiments, calculating the reference value can comprise calculating the mean value of the reference data and a characterising moment, e.g., the standard deviation of the reference data. In such embodiments, the thus calculated mean value and characterising moment can be used to calculate the reference value by selecting a characterising moment factor, e.g. a standard deviation factor, from the control definition repository and adding the mean value to the product of the characterising moment and the characterising moment factor.

In order to guarantee a minimum level used for alarm mask computation, embodiments of the method may be characterized in that the method further comprises a step of selecting a minimum value parameter from the control definition repository and further a step of replacing the mean value by the minimum value parameter on the condition of the mean value being less than the minimum value parameter. Thus, the mean value is overwritten by the minimum value parameter and the minimum value parameter is used throughout the execution of the method instead of the mean value.

Likewise, in order to guarantee a maximum level used for alarm mask computation, embodiments of the method may be characterized in that the method further comprises a step of selecting a maximum value parameter from the control definition repository and further a step of replacing the mean value by the maximum value parameter on the condition of the mean value being greater than the maximum value parameter. Thus, the mean value is overwritten by the maximum value parameter and the maximum value parameter is used throughout the execution of the method instead of the mean value.

Embodiments of the method may be characterized in that, upon selection by an operator, calculating the reference value comprises calculating the maximum of the reference data. Thus, as a reference value, the maximum value of the selected data is used.

In embodiments of the method, a step of selecting a data amount parameter from the control definition repository is comprised, and method execution is discontinued on the condition of the amount of the selected reference data being less than the data amount parameter. In this manner, it is provided that alarm masks are only generated on sound measurement data. If there is no sufficient amount of error-free data available from the data selecting step within the defined time interval, method execution is discontinued instead of an unreliable generation of alarm masks.

In other words, a set of reference data for each bin is selected based upon a plurality of condition variables of the wind turbine. In such embodiments, a first and a second alarm mask can be generated for each of the condition variables and/or for each bin selected based upon a condition variable, or a plurality thereof, respectively.

Further, the reference data may form a reference series and the method may consequently comprise a step of transforming the reference series into a step function which associates constant function values to intervals of the function domain. The function value of each interval of the step function can, in embodiments, be determined by the maximum value of the untransformed reference series in that interval and/or a shuffle value can be selected from the control definition repository, on the basis of which the size of each interval is defined. The reference series can comprise any form of spectrum, such as auto spectrum, envelope autospectrum, cepstrum, or the like.

In embodiments, in which a set of condition variables, or a set of measurement values, form a spectrum, first and second alarm masks are generated for each of said intervals in the domain of the step function.

Embodiments of the method may further be characterized in that the range of value of the reference data is divided into a plurality of operational state bins of the wind turbine, and further in that one first and one second alarm mask is generated for each operational state bin. Thus, in particular, in embodiments of the method, a first and a second alarm mask can be generated for each condition variable and for each bin describing the operational state of the wind turbine or one of its components.

The invention according to another embodiment provides a method of condition monitoring in a wind turbine, comprising the steps of:
  Selecting a first and a second generated alarm mask;
  Obtaining at least one condition measurement value;
  Determining if the measurement value exceeds the first alarm mask;
  On the condition of the measurement value exceeding the first alarm mask, incrementing a first hysteresis counter, else decrementing the first hysteresis counter;
  Determining if the measurement value exceeds the second alarm mask;

On the condition of the measurement value exceeding the second alarm mask, incrementing a second hysteresis counter, else decrementing a second hysteresis counter;

Determining if the first hysteresis counter exceeds a first alarm level, and, on the condition of the first hysteresis counter exceeding the first alarm level, produce a first alarm;

Determining if the second hysteresis counter exceeds a second alarm level, and, on the condition of the second hysteresis counter exceeding the second alarm level, produce a second alarm.

By introducing a hysteresis counter for each alarm mask and by incrementing the first hysteresis counter upon a measurement value exceeding the threshold, or other criteria defined by the first alarm mask, and generating an alarm of the first type only on the condition of the hysteresis counter exceeding a predefined level, additional stability of the condition monitoring method is provided as compared to systems which generate alarms immediately based upon the measurement value exceeding the alarm mask. By such use of the hysteresis counter, it is prevented that an alarm is given due to spurious measurements. In embodiments comprising a step function, hysteresis counters can accordingly be implemented for each interval of the step function.

Accordingly, the hysteresis counter for the second type of alarm is increased upon the measurement value exceeding the second alarm mask. When the measurement values are below the first (or second) alarm mask, the first (or second) hysteresis counter is decremented accordingly. In order to provide that the hysteresis counter remains within a reasonable range of values, so that proper alarm generation is guaranteed within a predefined amount of critical value measurements, a maximum and a minimum value for each of the hysteresis counters can be defined.

Embodiments of the method may be characterized in that the first alarm is removed on the condition of the first hysteresis counter falling below a first remove alarm level. This remove alarm level may be set to be equal to the first alarm level, or may be set to be a certain value below the first alarm level.

Embodiments of the method may further be characterized in that a second alarm (red alarm) remains until it is removed by a manual operator setting.

The method may be further embodied in that it further comprises selecting a third alarm mask (blue alarm mask) from a control definition repository and in that it further comprises the steps of determining if the measurement value is below the third alarm mask; on the condition of the measurement value being below the third alarm mask, incrementing a third hysteresis counter, else (the measurement value being greater than or equal the third alarm mask) decrementing a second hysteresis counter; and determining if the third hysteresis counter exceeds a third alarm level, and, on the condition of the third hysteresis counter exceeding the third alarm level, produce a third (blue) alarm.

By providing a third alarm, the system may not only detect temporary (yellow) critical conditions or critical conditions corresponding to permanent defects (red) but also may indicate that the measurement values are unrealistically low and that an error in the monitoring system itself may be present (blue alarm).

The method may be embodied in that the range of values of the condition measurements is divided into a plurality of operational state bins of the wind turbine, the condition measurement value is associated to a first of the operational state bins, the first and second alarm mask is associated to a second of the operational state bins, and in that the first and second alarm mask is only applied to the condition measurement value on the condition of the first and second associated operational state bins being identical.

Thus, evaluation of measurements is always restricted to the data which is associated to the same operational state bin as the alarm mask.

If then an alarm mask is exceeded, the method of condition monitoring may comprise the further following further steps:

Recalling the alarm mask definition parameters;

Modifying the alarm mask definition parameters and analyzing the effect of changing the parameters;

Redo generating of an alarm mask according to the inventive method of generating an alarm mask based on the modified alarm mask definition parameters.

The invention according to a further embodiment provides a wind turbine monitoring system, comprising a processing unit that is configured to execute the steps of the method.

As the person skilled in the art will acknowledge, both methods may be combined and implemented in a wind turbine monitoring system and/or wind turbine control system. The processing unit comprised in such a wind turbine control and/or monitoring system can be configured to execute the steps of the methods by appropriate programming, or the use of application specific integrated circuits, or any combination of generic or application specific hardware and software.

BRIEF DESCRIPTION OF THE DRAWINGS

The invention will be described in more detail below, referring to the following figures.

DETAILED DESCRIPTION OF INVENTION

Figure 1:
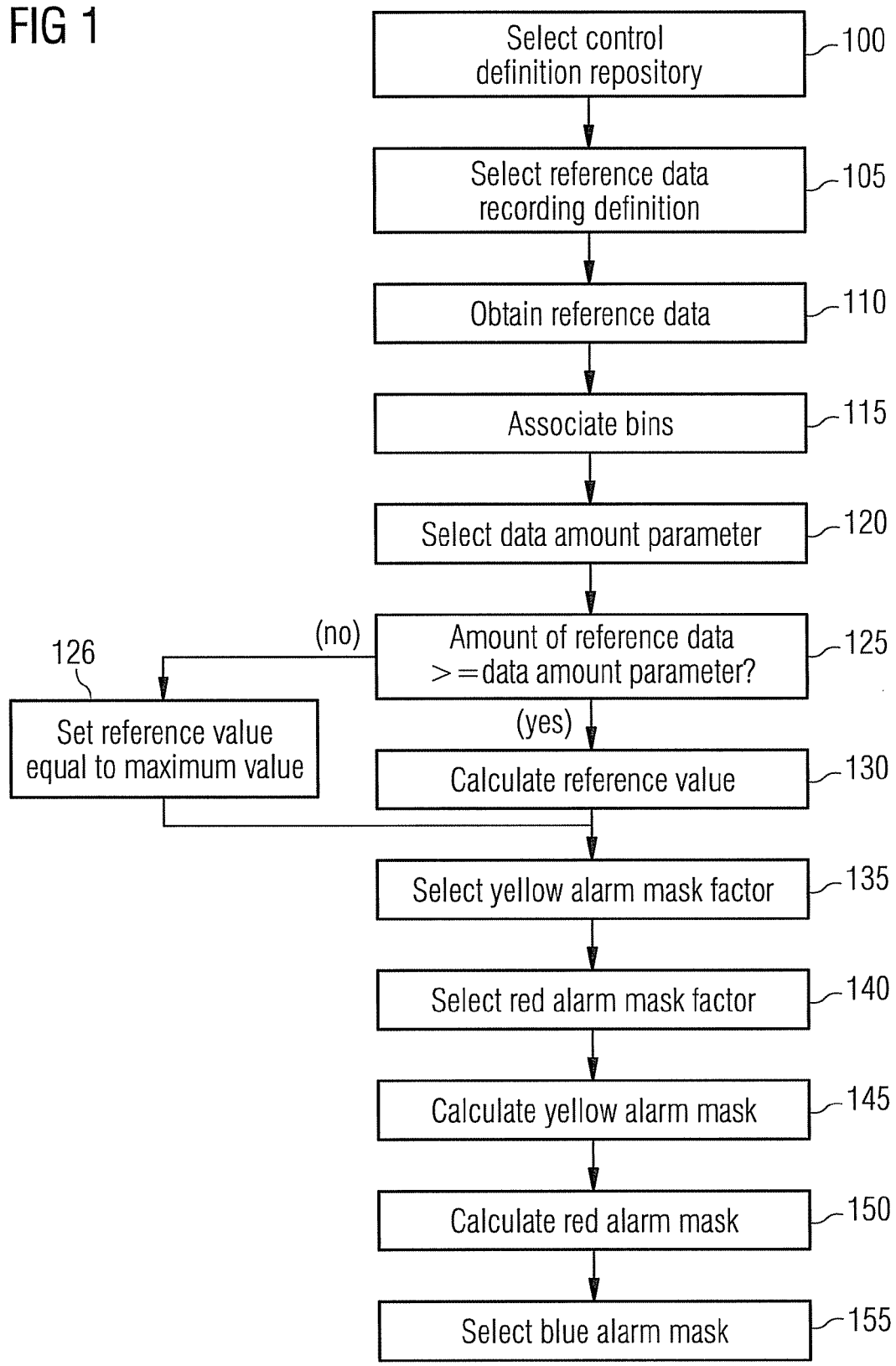
FIG. 1 shows a schematic overview over a first part of an embodiment of the invention.

FIG. 1 shows a schematic overview of an embodiment of a first part of the method of present invention, which first part refers to the generating of alarm masks which can be used in a second part of the embodiment. The second part concerns the actual condition monitoring of a wind turbine using those alarm masks.

All steps of the method can be performed by a processing module which may be comprised in a condition monitoring unit of a wind turbine and/or in a control unit of a wind turbine and/or in a central office, e.g. in a control center. As the person skilled in the art will acknowledge, the processing unit can be configured to execute all of the method steps (or any subset thereof) using appropriate software, hardware, or combinations thereof. In particular, the processing unit can be programmed to execute the method steps.

In step 100, a control definition repository is selected which may be comprised in a memory connected to the processing unit or comprised therein. In the control definition repository, definitions and/or rules are comprised that are used for the subsequent generation of alarm masks by the present embodiment.

Since, in the present embodiment, alarm masks are generated for each wind turbine and each bin describing an operational state (operational state bin), rules are defined in the control definition repository for each turbine and each operational state bin that alarm masks will be generated for.

The control definition repository of the present embodiment thus comprises:
- time and/or date for starting the selecting of data on which the subsequent generation of alarm masks is to be based (reference data)
- the amount of data and/or number of measurements of each condition variable necessary to achieve sufficient statistical accuracy
- a mask mode (peak value or standard deviation)
- a standard deviation factor
- a minimum value parameter (minimum level)
- a maximum value parameter (maximum level)
- a first (yellow) alarm mask factor and a second (red) alarm mask factor, in decibel (dB)
- a third (blue) alarm mask, or level, indicating the lowest acceptable value
- a shuffle value, i.e. an interval width inside which a maximum detection is done
- a first (yellow), a second (red), and a third (blue) hysteresis counter definition
- settings for rejection of overload data
- settings for rejection of data with bias voltage errors.

In step 105, the reference data selecting definition comprising time and date for starting and ending the selecting of the reference data is selected from the control definition repository. In step 110, reference data are obtained in the form of measurement values based on condition variables characteristic of the operational state of the wind turbine.

In step 115, operational state bins are associated to the selected reference data by tagging the measured values of the condition variables with the index (or indices) of the bin representing the operational state that prevailed at the point of time the measurement was carried out. The N-dimensional parameter space (i.e. the condition variables) describing the operational state is subdivided into bins (operational state bins). Whenever values of condition variables describing the operational state of a wind turbine are of the same bin, the operational state is assumed to be the same as well. Thus, evaluation of measurements can be restricted to data that is tagged with the same operational state bin index.

In step 120, the data amount parameter, that is, the number of measurements of each condition variable necessary to achieve sufficient statistical accuracy, is selected from the control definition repository. Based on this data amount parameter, it is determined in step 125 if the amount of reference data is greater than or equal to the data amount parameter. By doing so, it is established that sufficient error-free data are available so that a sufficient statistical accuracy can be guaranteed for the generation of alarm masks.

If, for example, an error information is present for a particular sensor, for example because it has been overloaded for a period of time, data recorded from that sensor or that time period are discarded. Thus, only data that are deemed error-free are used in the generation of masks, and, as will be seen with regard to blue alarms further below, in the subsequent evaluation of the condition of the monitored turbines. Data invalidity may also be based on other forms of sensor error information, e.g., a bias voltage error of a constant-current line drive accelerometer or a self test signal of an oil debris counter.

Thus, a guaranteed reliability of the generated alarm masks and wind turbine condition monitoring based on these masks is provided. If sufficient data is available, method execution continues with step 130. If not, method execution is discontinued. Such a discontinuation of generating alarm masks, however, does not prevent from providing alarm detection: in embodiments the method may comprise selecting a default maximum alarm mask in the case of discontinuation, and generate alarms using the default alarm mask. More precisely, such an embodiment may comprise spawning off a temporary alarm mask based on the default maximum alarm mask, thus assuring a maximum level monitoring of the turbine, while awaiting sufficient data for successfully automatic generating of alarm masks.

In step 130, for each condition variable, and each bin describing the operational state, a reference value is calculated. Details of this calculation are explained in more detail with reference to FIG. 2 further below. Then the method proceeds to step 135.

If, on the other hand, in step 125 it is determined that the amount of reference data is less than the data amount parameter the method proceeds to step 126 where the reference value is set to the maximum value before the method further proceeds to step 135.

In steps 135 to 150, a first and a second alarm mask (yellow and red) are calculated for each condition variable and for each operational state bin. For this, the first alarm mask factor is selected from the control definition repository in step 135, and the red alarm mask factor is selected from the control definition repository in step 140. Then, in step 145, the yellow alarm mask is calculated by way of multiplying the yellow alarm mask factor by the reference value calculated in step 130. Likewise, the red alarm mask is obtained in step 150 by multiplying the red alarm mask factor by the calculated reference value.

Embodiments of the present invention may also comprise particular steps of calculation in cases where the calculated reference values of step 130 form a reference series, like, e.g., a reference spectrum, an autospectrum, an envelope autospectrum, a cepstrum, etc., and where subsequent steps of transformation are applied to the reference series before calculating the alarm masks based on the reference series in the manner described with regard to steps 135 to 150. Such steps of reference series transformation are described with regard to FIG. 3 in more detail below.

In step 155, finally, the blue alarm mask is directly selected from the control definition repository. While the yellow alarm mask can be used for detecting temporary critical conditions, and the red alarm mask for permanent critical conditions, such as structural damages, both of these alarms are based on the individual structural and dynamic characteristics of each particular wind turbine. The blue alarm mask, however, is to detect implausibly low values that are generated by the present method, so that a defect, or temporary errors of a monitoring system, can be detected.

Figure 2:
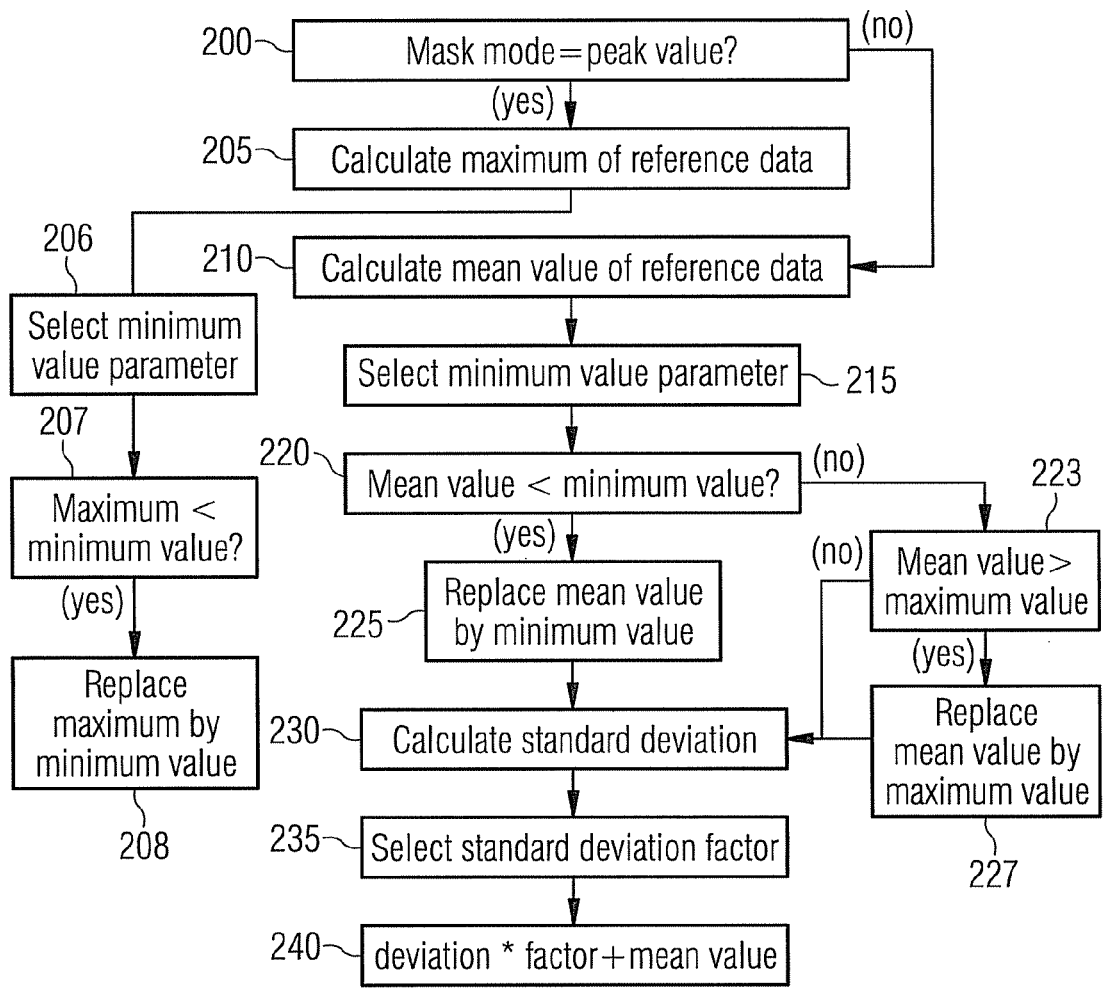
FIG. 2 shows a detail of the embodiment shown in FIG. 1 with regard to calculating the reference value.

FIG. 2 shows a detail of reference value calculation of the first part of the method embodiment shown in FIG. 1. In step 200, it is determined if the system is in a maximum value mode. In maximum value mode, which is typically activated by manual selection performed by an operator, the reference value is set equal to the maximum value of the selected reference data. In order to do so, the maximum of the reference data is calculated in step 205. Then, in step 206, a minimum value parameter, which is defined in the control definition repository for each condition variable, is selected and compared to the calculated maximum in step 207. In this step, it is determined whether said maximum is less than the selected minimum value parameter, and, in case the maximum is less than the minimum value parameter, the maximum is replaced by the minimum value parameter in step 208. Thus, either the maximum or the minimum value parameter is fed into the run of the method steps as described above as the reference value.

If the detection step 200 determines the system not to be in maximum value mode, the mean value of the reference data is calculated in step 210. Then, in step 215, the minimum value parameter, which is defined in the control definition repository for each condition variable, is selected and compared to the calculated mean value in step 220. In this step, it is determined if said mean value is less than the selected minimum value parameter, and if the mean value is less than the minimum value, the mean value is replaced by the minimum value in step 225 and the method proceeds to step 230. Thus, the minimum value is used for the subsequent steps of reference value calculation instead of the mean value. If, on the other hand, it is determined in step 220 that the mean value is not less than the minimum value, the method proceeds to step 223 where it is detected whether the mean value exceeds the selected maximum value parameter. In case of yes, the mean value is replaced by the maximum value in step 227 and the method proceeds to step 230. Thus, the maximum value is used for the subsequent steps of reference value calculation instead of the mean value. If, in step 223, it is detected that the mean value does not exceed the selected maximum value parameter the method proceeds to step 230.

If the mean value is not less than the minimum value, calculation of the reference value is continued in step 230 using the calculated mean value for further method execution.

In a corresponding manner, embodiments comprising a maximum value parameter further comprise a step wherein it is determined if said mean value is greater than the selected maximum value parameter, and if the mean value is greater than the maximum value, the mean value is replaced by the maximum value. Thus, the maximum value is used for the subsequent steps of reference value calculation instead of the mean value. If the mean value is not greater than the maximum value, calculation of the reference value is continued in step 230 using the calculated mean value for further method execution.

In step 230, the standard deviation of the selected reference data is calculated. Then, in step 235 the standard deviation factor is selected from the control definition repository.

In step 240, for each condition variable and each bin describing the operational state, a reference value ref is generated as:

ref=devi*factr+mval, mval being the calculated mean value of reference data from step 210, or the minimum value that the mean value has been replaced with in step 225, devi being the calculated standard deviation from step 230, and factr being the selected standard deviation factor from step 235. The reference value ref thus calculated is used for further method execution as described above with reference to FIG. 1. Alternatively, the reference value can be set to the maximum value recorded.

Figure 3:
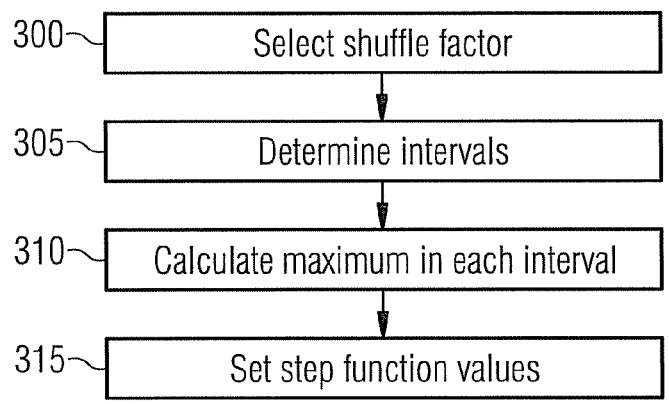
FIG. 3 shows a detail of the embodiment of FIG. 1 with regard to modification of the reference series.

FIG. 3 shows an embodiment detail of the first part of the embodiment of the present invention. In case the set of condition variables from which the reference data are acquired form a spectrum, the obtained reference values consequently form a reference series. In order to account for variations in frequencies thus measured, the present embodiment provides the steps of modification of the reference series as shown in steps 300 to 315. In these steps, the reference series is modified to consist of intervals which each have a constant value, such that the value $y(x_0)$ is equal to the maximum of $y(x)$ in a closed interval $[x_0-\text{deltax}; x_0+\text{deltax}]$ of the original reference series. Here, x, $x_0$, and deltax are integral values, and the parameter deltax is provided through the shuffle value given in the control definition repository.

Thus, in step 300, the shuffle value is selected from the control definition repository, in step 305 the intervals on the basis of which the modification is carried out are determined using the selected shuffle value, and as explained above.

In step 310, the maximum function value of the original reference series is calculated in each of the determined intervals, and in step 315, finally, the function values of the step function (piecewise constant function) thus generated are set. Thus, the modified reference series, or the totality of the reference values of which the spectrum is composed, is used for subsequent calculation of the alarm masks as described with reference to FIG. 1.

Figure 4:
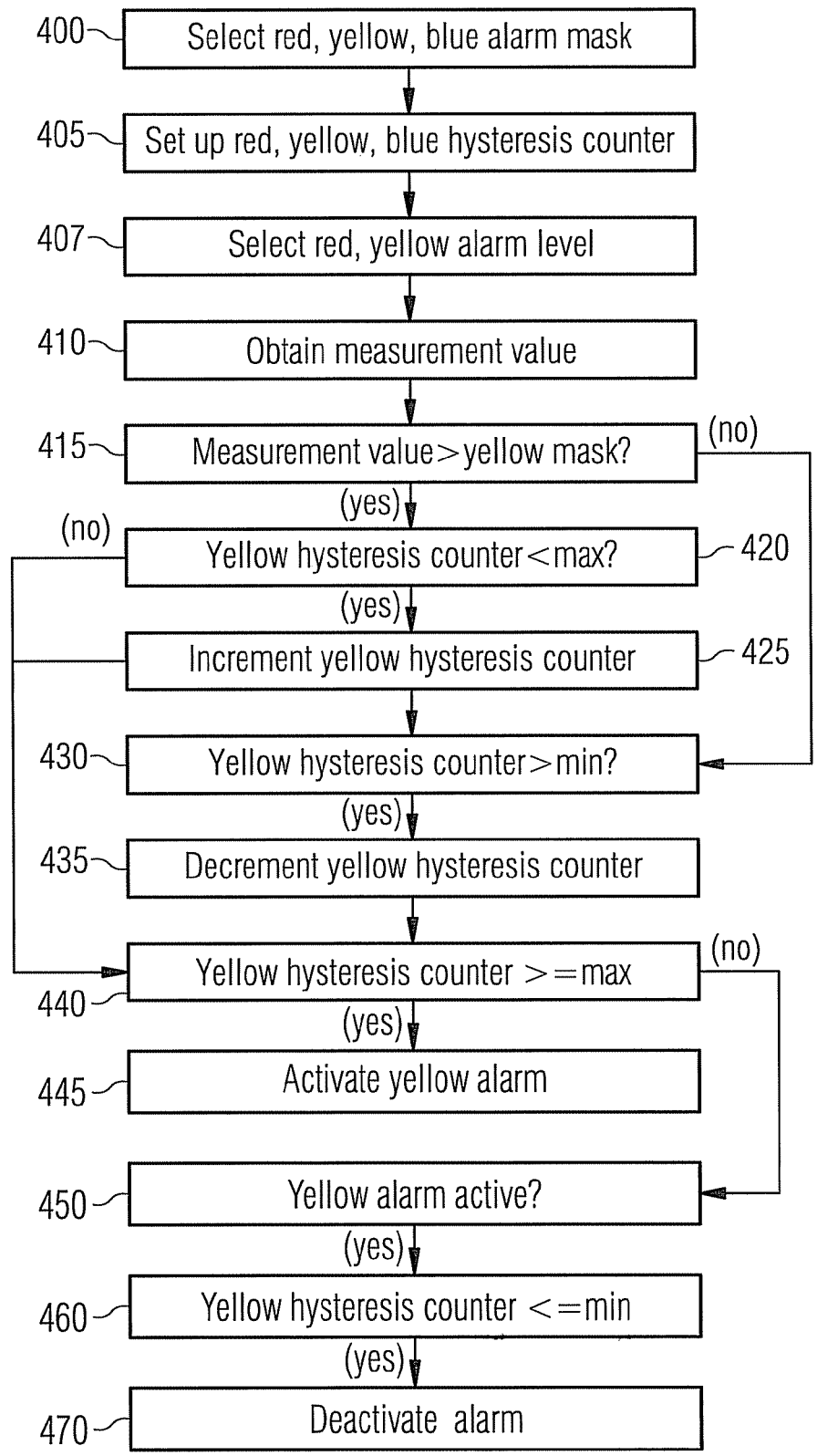
FIG. 4 shows an overview of a second part of the embodiment of the invention.

FIG. 4 shows a second part of the embodiment of the present method. This part of the embodiment shows condition monitoring of a wind turbine based on the first, second, and third (yellow, red, and blue) alarm mask generated as described with reference to FIGS. 1 to 3. First, in step 400, the yellow, red, and blue alarm masks are selected by taking the alarm masks that have been generated in steps 145, 150 and selected in step 155. Thus, for each condition variable and each operational state bin, three alarm masks (yellow, red and blue) are obtained.

Then, in step 405, for each of the masks a corresponding yellow or red hysteresis counter is set up, while there is only one common blue hysteresis counter being set up. For doing so, the appropriate hysteresis counter definitions are selected from the control definition repository. In implementations in which the set of condition variables forms a series, as discussed above, yellow and red hysteresis counters will not be defined for each point in the spectrum but only for each of the intervals of the step function, that is, where the modified reference series is of constant value. In embodiments however where the set of condition variables does not form a series, hysteresis counters are defined for each condition variable.

In step 407, a red alarm level and a yellow alarm level are selected from a corresponding definition in the control definition repository.

In step 410, measurement values are obtained by taking input values of condition variables representing wind turbine dynamics. The control definition repository also contains settings for determining whether only error free or all measurement values are compared to the mask. Each new and error-free measurement value of a particular condition variable is then tagged with the corresponding bin index (representing the operational state of the wind turbine that is or was current when the measurement was recorded). Then, the measurement value is compared to the blue, yellow, and red alarm masks that are of the same bin as the measurement value. Thus, evaluation of measurement values is at all times restricted to data which is tagged with the same bin index as the alarm mask.

The particular steps of comparing the measurement value to the corresponding alarm masks and subsequent generation of alarms will be described in the following:

In step 415, it is determined if the obtained measurement value is larger than the yellow mask. As the person skilled in the art will acknowledge, the present use of the comparison operators such as 'larger than', or 'less than', is representative of other methods of determining if the obtained measurement value satisfies the condition as defined by the alarm masks or not. If the measurement value exceeds the yellow mask (or satisfies the yellow mask condition), it then is determined if the yellow hysteresis counter is below a predefined maximum value for the yellow hysteresis counter in step 420. Such a maximum value for a hysteresis counter can be part of the hysteresis counter definition in the control definition repository. If the yellow hysteresis counter is below the maximum value for the yellow hysteresis counter, the yellow hysteresis counter is incremented in step 425.

Either after step 420, or after step 425, the method is continued with step 440, as will be described later.

If step 415 determines the measurement value not to be greater than (or satisfy the condition of) the yellow mask, it continues method execution with step 430 instead of steps 420 and 425. In step 430, it is determined if the yellow hysteresis counter is greater than a predetermined minimum value for the yellow hysteresis counter. Like the maximum value for the yellow hysteresis counter, the minimum value for the yellow hysteresis counter can be made part of the hysteresis counter definition in the control definition repository. If the yellow hysteresis counter is greater than the minimum value, it will be decremented in step 435. If the yellow hysteresis counter is of the minimum value, no further alarm detection will be necessary in the present run of yellow alarm detection for this particular measurement value and alarm mask.

Now, in step 440, it is determined if the yellow hysteresis counter is larger than or equal to a predefined maximum level. The maximum level can also be defined in the control definition repository. If the hysteresis counter is greater than the maximum level, a yellow alarm will be activated in step 445. If the yellow hysteresis counter is less than the maximum level, it is determined if currently a yellow alarm is active in step 450 and, if so, it will be detected, in step 460 whether the yellow hysteresis counter is less than, or equal to, a minimum value. In case of yes, the yellow alarm will be deactivated in step 470. Thus, when a critical condition arises that causes the yellow alarm mask to be exceeded by the measurement value for a certain number of measurements, the yellow alarm will be activated, and if a certain number of 'normal' measurement values are obtained after that, so that the yellow mask is not exceeded anymore, the yellow alarm is deactivated again, so that the yellow alarm mechanism is suitable for temporary critical conditions.

Figure 5:
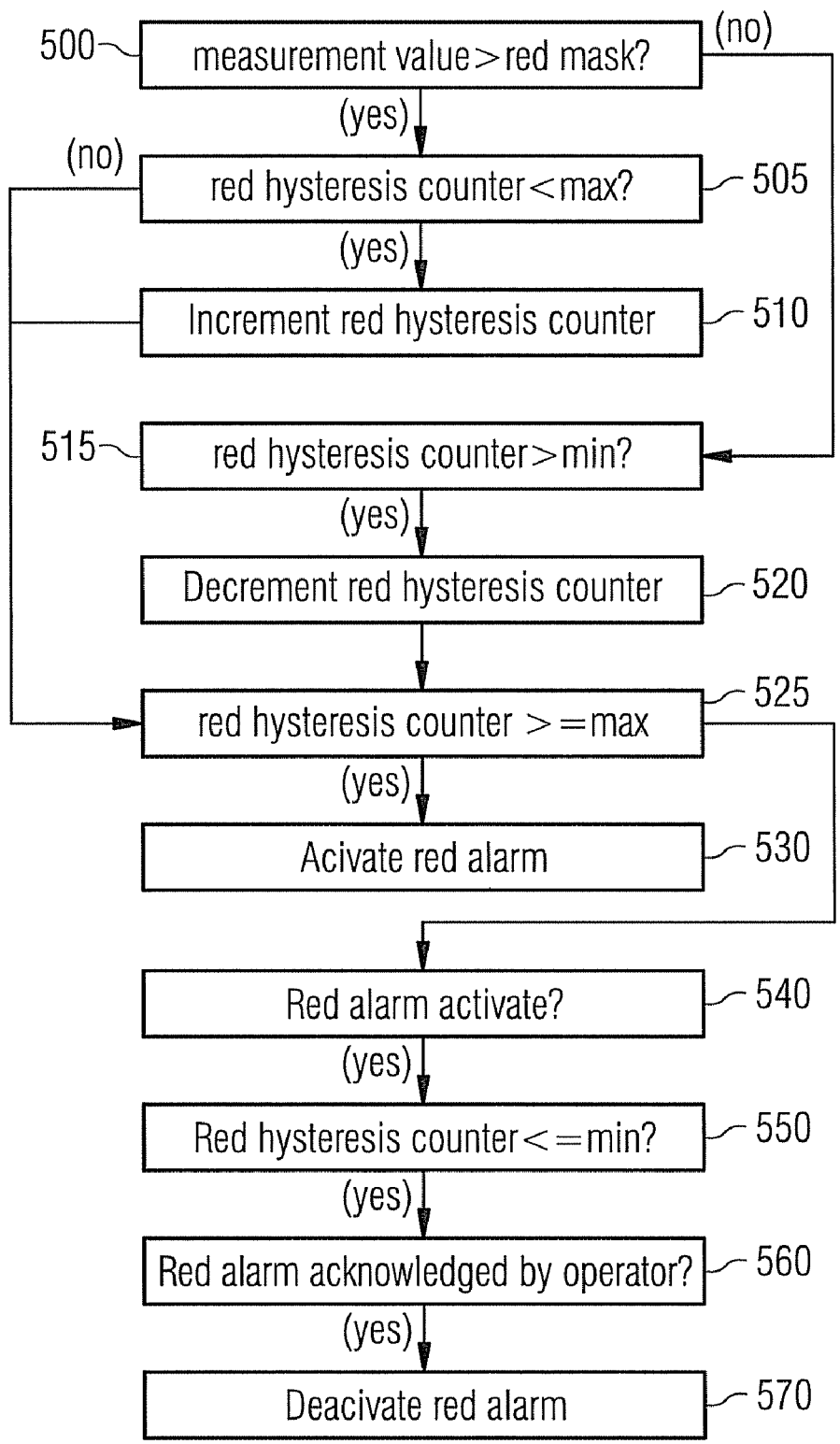
FIG. 5 shows a third part of the embodiment of the method.

FIG. 5 shows the corresponding detection of red alarms. However, since red alarms are to inform about permanent damages that require maintenance or examination by a maintenance person, these can be automatically generated but only manually removed. Generally, the method steps and characteristics of each of the method steps correspond to those given with regard to the yellow alarms. In step 500, it is determined if the measurement value exceeds the red alarm mask. If the measurement value does not exceed the red alarm mask, the method is continued in step 515. If the measurement value does exceed the red mask, it is determined if the red hysteresis counter is less than the maximum value that is predefined for the red hysteresis counter in step 505. If the red hysteresis counter is less than the maximum value for the red hysteresis counter, the red hysteresis counter is incremented in step 510. After completion of step 505 and/or step 510, method execution is continued in step 525.

In step 515, it is determined if the red hysteresis counter is greater than the minimum value for the red hysteresis counter. If yes, the red hysteresis counter is decremented in step 520.

In step 525, it is determined if the red hysteresis counter is greater than or equal to the maximum level. If so, a red alarm is activated in step 530. In case the red hysteresis counter is less than the maximum level, it is determined if currently a red alarm is active in step 540 and, if so, it will be detected, in step 550 whether the red hysteresis counter is less than, or equal to, a minimum value. In case of yes, it will be checked whether the red alarm is acknowledged by an operator in step 560 and, if so, the red alarm will be deactivated in step 570.

Figure 6:
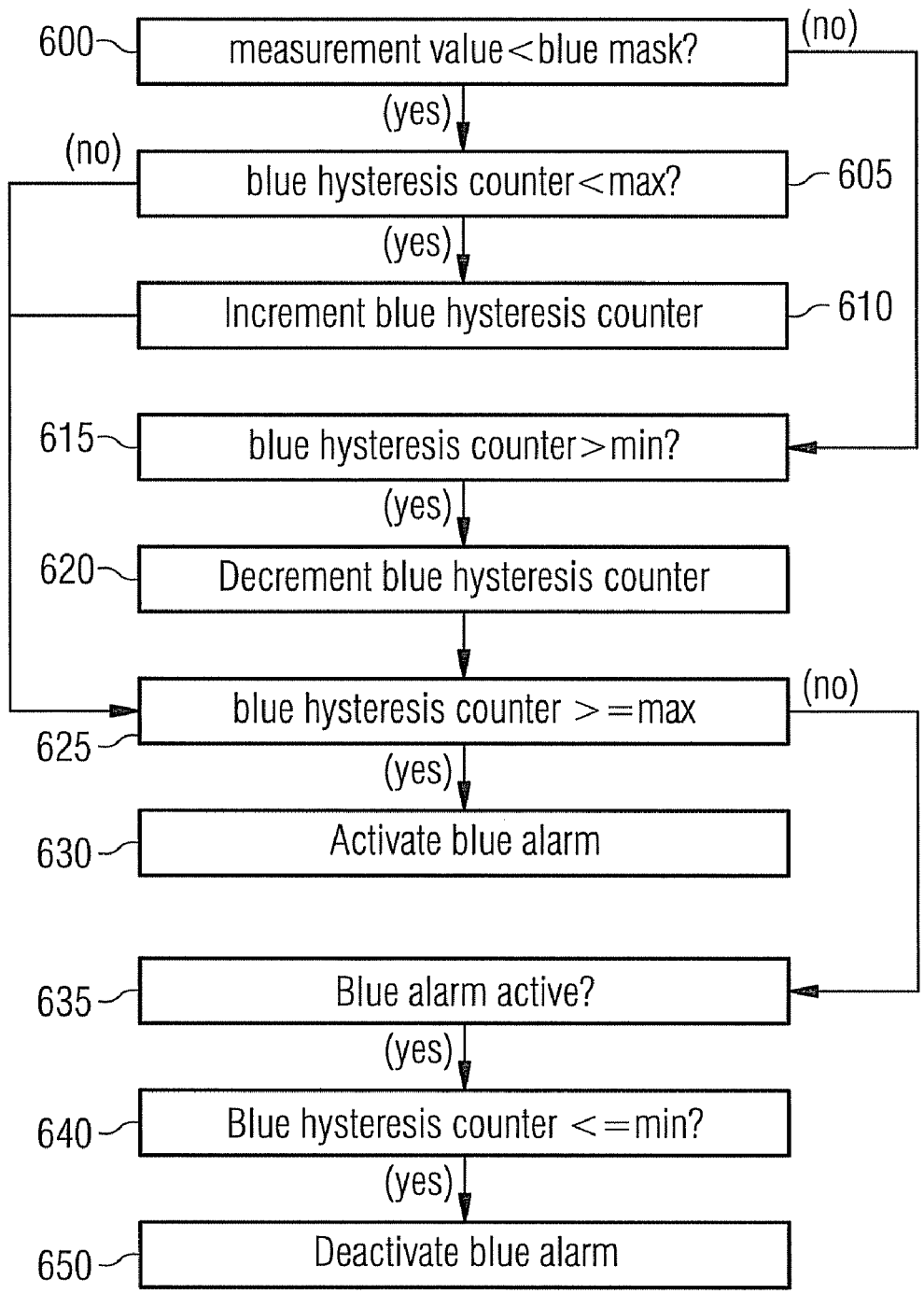
FIG. 6 shows a fourth part of the embodiment of the method.

The detection and generation of red alarms as just described can take place after the detection of yellow alarms as described with reference to FIG. 4 or in parallel to that. The same is true for the detection of blue alarms, as will be now described with reference to FIG. 6. Like the yellow alarms, the blue alarms are temporary alarms as well that persist until the corresponding hysteresis counter assumes a value below the blue (or yellow) alarm level or below another predetermined remove alarm level (yellow remove alarm level or blue remove alarm level).

As opposed to the red and yellow alarms, wherein the hysteresis counter is incremented whenever the measurement values exceed the corresponding alarm mask, the blue hysteresis counter is incremented whenever the measured value is below the blue mask, unless the counter value is already equal to its maximum value. And consequently if the obtained measurement value is above the blue mask, the blue hysteresis counter is decremented, unless the counter value is already equal to its minimum value. Thus, a blue alarm indicates that measure values are implausibly small and that an error in the monitoring system itself is probable.

In step 600, it is determined if the measurement value is less than the blue alarm mask. If the measurement value is not less than the blue alarm mask, method execution will continue with step 615. If the measurement value is below the blue alarm mask, it is determined if the blue hysteresis counter is below the maximum value that is defined for the blue hysteresis counter in the control definition repository, in step 605. If the blue hysteresis counter is below the maximum, the blue hysteresis counter is then incremented in step 610. Either after execution of step 605 and/or step 610, method execution is continued in step 625.

In step 615, it is determined if the blue hysteresis counter is greater than the minimum value defined for the blue hysteresis counter. If so, the blue hysteresis counter is decremented in step 620.

In step 625 it is determined if the blue hysteresis counter is greater than or equal to a maximum level. If so, a blue alarm is activated in step 630.

If the blue hysteresis counter is less than the maximum level, it is determined if a blue alarm is currently active in step 635. If that is the case, it will be detected, in step 640 whether the blue hysteresis counter is less than, or equal to, a minimum value and, in case of yes, the blue alarm will be deactivated in step 650.

The present embodiment thus provides for a method of automated alarm mask generation and condition monitoring of a wind turbine such that by automatic generation of alarm masks based on predefined rules and on measurements that were carried out by each individual wind turbine by itself, the technical cost and effort needed for alarm mask generation is significantly reduced while improving the accuracy of alarm mask setting and automated alarm generation. Further, the use of hysteresis counters provides for reliable operation that prevents that an alarm is produced based on spurious measurements.

In an alternative to the describe embodiment, the following course of action is possible, when an alarm mask is exceeded:
 (a) Recall the alarm mask definition parameters
 (b) Modify the alarm mask definition parameters and analyze the effect of changing the parameters (eg. is data available?)

(c) Redo mask calculation based on modified parameters (adaption to the turbine state which can dynamically change vs time)

This latter functionality relies on an operator being assisted by the system

The invention claimed is:

1. A method of automatically generating an alarm mask for condition monitoring in a wind turbine, comprising:
   selecting a reference data selecting definition from a control definition repository in the condition monitoring of the wind turbine, wherein the reference data selecting definition specifies a time interval of recorded reference data;
   selecting a reference data, from a sensor located in the wind turbine, recorded during the time interval;
   calculating a reference value based on the reference data;
   selecting a first alarm mask factor and a second alarm mask factor from the control definition repository;
   calculating a first alarm mask based on multiplying the first alarm mask factor by the reference value; and
   calculating a second alarm mask based on multiplying the second alarm mask factor by the reference value.

2. The method according to claim 1, further comprising:
   providing a plurality of bins, each bin representing a different operational state of the wind turbine; and
   determining the bin, for each reference data, into which the respective reference data falls,
   wherein the selecting the first and second alarm mask factors, the calculating the reference value, the calculating the first alarm mask and the calculating the second alarm mask is implemented for each combination of bin and reference data.

3. The method according to claim 1, wherein the calculating the reference value comprises calculating a mean value of the reference data and a characterising moment of the reference data.

4. The method according to claim 3, wherein the calculating the reference value comprises selecting a characterising moment factor from the control definition repository and adding the mean value to the product of the characterising moment and the characterising moment factor.

5. The method according to claim 3, further comprises selecting a minimum value parameter from the control definition repository and replacing the mean value by the minimum value parameter on the condition of the mean value being less than the minimum value parameter.

6. The method according to claim 1, wherein the calculating the reference value comprises calculating a maximum of the reference data upon selection by an operator.

7. The method according to claim 1, further comprises selecting a data amount parameter from the control definition repository and discontinuing method execution when an amount of selected reference data being less than the data amount parameter.

8. The method according to claim 1, wherein the reference data form a reference series.

9. The method according to claim 8, further comprises transforming the reference series into a step function, the step function associating constant function values to intervals.

10. The method according to claim 9, wherein a function value of each interval of the step function is determined by a maximum value of the untransformed reference series in that interval.

11. The method according to claim 9, wherein a shuffle value is selected from the control definition repository and a size of each interval is defined on a basis of the shuffle value.

12. The method according to claim 9, wherein the first and the second alarm mask is generated for each interval.

13. The method according to claim 1, further comprising:
   obtaining a condition measurement value;
   determining the bin the condition measurement value falls into;
   selecting a calculated respective first and second alarm for the deteimined bin;
   incrementing a first hysteresis counter when the measurement value exceeds the first alarm mask,
   decrementing the first hysteresis counter when the measurement value does not exceed the first alarm mask;
   incrementing a second hysteresis counter when the measurement value exceeds the second alarm mask;
   decrementing a second hysteresis counter when the measurement value does not exceed the second alarm mask;
   producing a first alarm when the first hysteresis counter exceeds a first alarm level; and
   producing a second alarm when the second hysteresis counter exceeds a second alarm level.

14. The method of claim 13, further comprises removing the first alarm when the first hysteresis counter falls below a first remove alarm level.

15. The method of claim 13, further comprises removing the second alarm upon a manual operator setting.

16. The method of claim 13, further comprises:
   selecting a third alarm mask from a control definition repository;
   incrementing a third hysteresis counter when the measurement value is below the third alarm mask;
   decrementing a third hysteresis counter when the measurement value is not below the third alarm mask; and
   producing a third alarm when the third hysteresis counter exceeds a third alarm level.

17. The method of claim 16, characterized in that the third alarm is removed on the condition of the third hysteresis counter falling below a second remove alarm level.

18. The method of claim 13, when the alarm mask is exceeded the method further comprises:
   recalling the alarm mask definition parameters;
   modifying the alarm mask definition parameters and analyzing the effect of changing the parameters;
   re-generating the alarm mask based on the modified alarm mask definition parameters.

* * * * *

UNITED STATES PATENT AND TRADEMARK OFFICE
CERTIFICATE OF CORRECTION

PATENT NO.        : 8,130,112 B2
APPLICATION NO.   : 12/560711
DATED             : March 6, 2012
INVENTOR(S)       : Klaus Gram-Hansen, Axel Juhl and Troels Kildemoes Moeller It is certified that error appears in the above-identified patent and that said Letters Patent is hereby corrected as shown below:

Column 14 line 18 "deteimined" should be changed to --determined--

Signed and Sealed this
Eleventh Day of December, 2012

David J. Kappos
*Director of the United States Patent and Trademark Office*